(12) United States Patent
Zeng et al.

(10) Patent No.: US 11,338,521 B2
(45) Date of Patent: May 24, 2022

(54) PARTS PACKING FOR A BUILD VOLUME

(71) Applicant: HEWLETT-PACKARD DEVELOPMENT COMPANY, L.P., Spring, TX (US)

(72) Inventors: Jun Zeng, Palo Alto, CA (US); David James Tucker, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 16 days.

(21) Appl. No.: 16/606,933

(22) PCT Filed: Dec. 15, 2017

(86) PCT No.: PCT/US2017/066830
§ 371 (c)(1),
(2) Date: Oct. 21, 2019

(87) PCT Pub. No.: WO2019/117963
PCT Pub. Date: Jun. 20, 2019

(65) Prior Publication Data
US 2021/0283850 A1   Sep. 16, 2021

(51) Int. Cl.
*G05B 19/4099* (2006.01)
*B29C 64/393* (2017.01)
*B33Y 10/00* (2015.01)
*B33Y 50/02* (2015.01)

(52) U.S. Cl.
CPC ........ *B29C 64/393* (2017.08); *G05B 19/4099* (2013.01); *B33Y 10/00* (2014.12); *B33Y 50/02* (2014.12)

(58) Field of Classification Search
None
See application file for complete search history.

(56) References Cited

U.S. PATENT DOCUMENTS

| 2006/0155418 | A1  | 7/2006  | Bradbury et al. |
| 2009/0326706 | A1  | 12/2009 | Fink et al. |
| 2014/0039847 | A1* | 2/2014  | Georgescu ............. G06F 30/23 703/1 |
| 2014/0081603 | A1* | 3/2014  | Griffith .................. G06F 30/20 703/1 |
| 2015/0154321 | A1  | 6/2015  | Schmidt et al. |
| 2015/0251356 | A1  | 9/2015  | Batchelder |

(Continued)

FOREIGN PATENT DOCUMENTS

| CN | 104842564   | 8/2015 |
| CN | 107160670 A | 9/2017 |

(Continued)

OTHER PUBLICATIONS

ASPE, "Dimensional Accuracy and Surface Finish in Additive Manufacturing", ASPE Spring Topical Meeting, Apr. 13, 2014, 244 pages.

(Continued)

*Primary Examiner* — Jason Lin
(74) *Attorney, Agent, or Firm* — Austin Rapp

(57) ABSTRACT

In an example of a method for parts packing, at least one part to be printed is identified. A placement and an orientation of the at least one identified part in a build volume of a three-dimensional (3D) printer is determined that optimizes a thermal uniformity inside the build volume.

13 Claims, 7 Drawing Sheets

(56) References Cited

U.S. PATENT DOCUMENTS

| | | | |
|---|---|---|---|
| 2015/0331402 A1 | 11/2015 | Lin et al. | |
| 2017/0176979 A1 | 6/2017 | Lalish et al. | |
| 2017/0252978 A1* | 9/2017 | Claes | B23K 26/342 |
| 2018/0043635 A1* | 2/2018 | Mantha | B33Y 50/00 |
| 2020/0193716 A1* | 6/2020 | Ge | G06F 30/20 |

FOREIGN PATENT DOCUMENTS

| | | |
|---|---|---|
| CN | 107206495 | 9/2017 |
| CN | 107206683 | 9/2017 |
| EP | 3200980 A | 8/2017 |
| KR | 20160136761 A | 11/2016 |
| WO | WO-2016195665 | 12/2016 |
| WO | WO-2017023284 | 2/2017 |
| WO | WO-2017074490 | 5/2017 |
| WO | WO2017077508 A1 | 5/2017 |
| WO | 2017/196346 A1 | 11/2017 |

OTHER PUBLICATIONS

Dickinson et al., "Packing Subsets of 30 Parts for Layered Manufacturing", International Journal of Smart Engineering System Design, vol. 4, No. 3, Jan. 1, 2002, pp. 147-161.
Multi-objective Optimization of 3d Packing Problem in Additive Manufacturing, Jan. 2014, https://www.researchgate.net/publication/288147774_Multi-objective_optimization_of_3D_p.

* cited by examiner

PARTS PACKING FOR A BUILD VOLUME

BACKGROUND

In three-dimensional (3D) printing, 3D solid parts may be produced from a digital model using an additive printing process. 3D printing may be used in rapid prototyping, mold generation, mold master generation, and short-run manufacturing. Some 3D-printing techniques are considered additive processes because they involve the application of successive layers of material. Moreover, some 3D printing systems may concurrently build multiple 3D solid parts in the build volume as part of a common build operation.

DETAILED DESCRIPTION

In some 3D-printing processes, materials may be heated, melted, and cooled. The thermal processes of heating, melting, and cooling may be referred to as a thermal experience. The functional quality of an end part may depend on voxel thermal uniformity—i.e., each voxel of the part undergoing a similar thermal experience. Thermal experiences may be considered similar when variances between the thermal experiences are within predetermined tolerances or thresholds. This may minimize functional irregularities—such as built-in thermal stress—that may result in warpage, and increase yield.

When multiple parts are printed concurrently in the same build volume or build envelope, part-to-part consistency may depend on the voxels of each part undergoing similar thermal experiences. Parts may be considered consistent when they have similar functional behavior—i.e., variances in functional attributes such as ultimate tensile strength (UTS), elongation at break (EOB), etc. that are within predetermined tolerances or thresholds.

In manufacturing settings, build volumes may be largely full, parts may be diverse and densely packed, and the part count may be on the order of hundreds of parts within a single build volume. The thermal experience of the build volume may be influenced by the placement (i.e., concentration and distribution) of agents (e.g., fusing agents, detailing agents, coloring agents, and/or other types of agents that can influence thermal energy received by the build material) inside the build volume. The placement of agents may be influenced by the placement and orientation of the parts.

This disclosure describes some examples of automated parts packing (e.g., the placement and the orientation of each part in the build volume) that is optimized for uniformity of a thermal distribution within a build volume. Automated parts packing optimized for uniformity of the thermal distribution may result in increased part yields and more consistent functional behavior in the completed parts.

Figure 1:
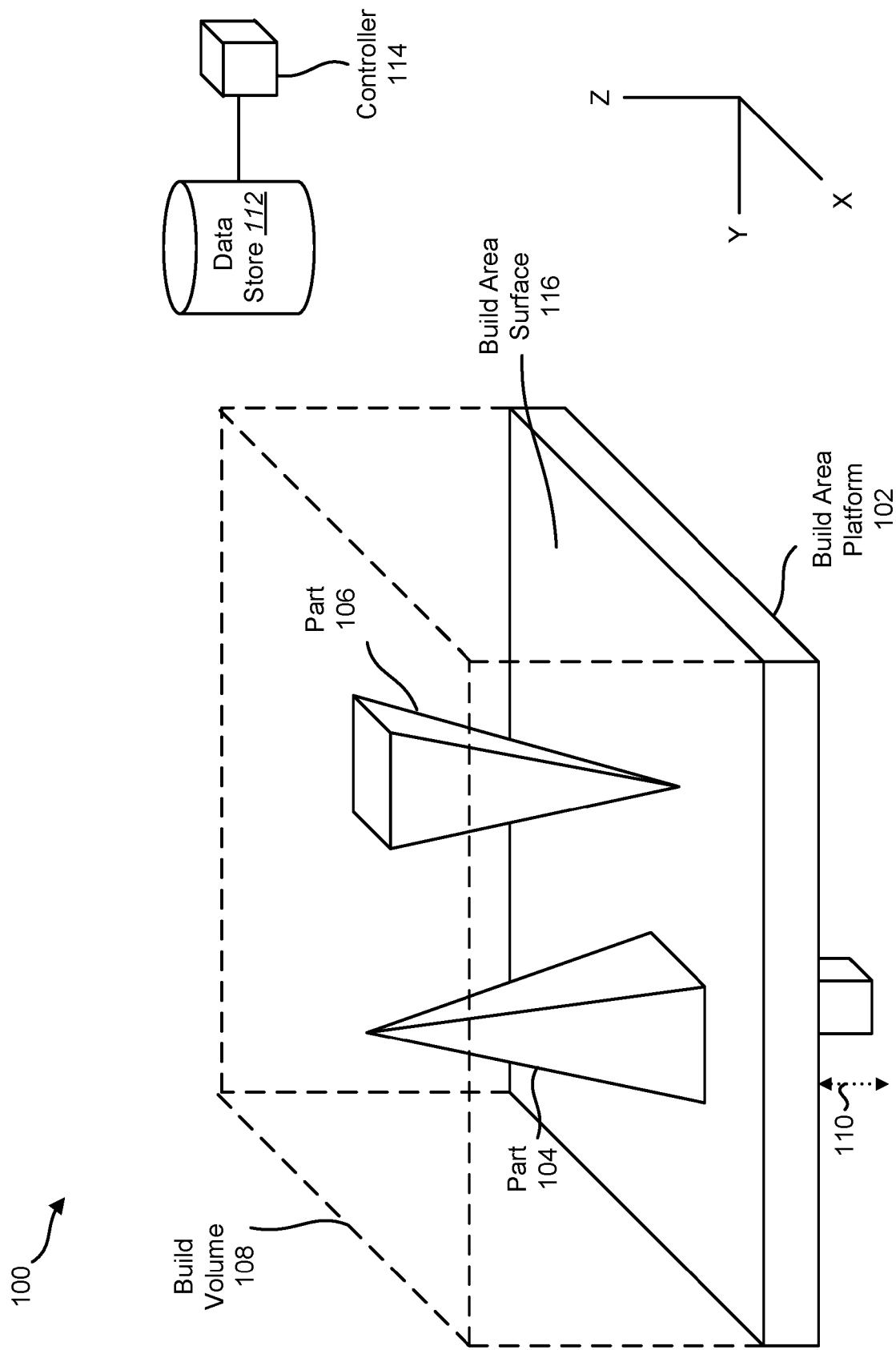
FIG. 1 is a simplified isometric view of an example of a 3D-printing system that may be used in an example of a 3D-printing method.

FIG. 1 is a simplified isometric view of an example of a 3D-printing system 100 that may be used in an example of a 3D-printing method. The 3D-printing system 100 may include a build area platform 102 that includes a build area surface on which part 104 and part 106 (also referred to as 3D parts or 3D objects) are generated from materials (not shown), such as build materials, agents, etc. In FIG. 1, two parts (part 104 and part 106) are shown for purposes of illustration. In other examples, more or less parts may be used. Parts 104 and 106 may be generated within a build volume 108 (also referred to as a build envelope). The build volume 108 may occupy a 3D space on top of the build area surface 116 of the build area platform 102. For instance, the build volume 108 may be the 3D space in which the 3D-printing system 100 may print or otherwise generate parts 104 and 106. The width and length of the build volume 108 may be constrained by the width and length of the build area platform 102. The height of the build volume 108 may be constrained by the amount the build area platform 102 may be moved in the z direction, where movement of the build area platform 102 in the z direction is represented by arrow 110.

The 3D-printing system 100 may print multiple parts 104 and 106 during a common printing operation (i.e., a single building operation within the build volume 108). The arrangement (e.g., location and orientation) of the parts 104 and/or 106 in the build volume 108 may be referred to as the parts packing or packing. A collision-free packing may refer to a parts packing in which no two voxels from different parts 104 and/or 106 occupy the same space in the build volume 108. The arrangement of a part 104 and/or 106 in the build volume 108 may include the placement or location of the part 104 and/or 106, and the orientation of the part 104 and/or 106 (e.g., yaw, pitch, and roll).

The controller 114 may be a computing device, a semiconductor-based microprocessor, a central processing unit (CPU), a graphics processing unit (GPU), field-programmable gate array (FPGA), an application-specific integrated circuit (ASIC), and/or other hardware device. The controller 114 may be connected to other components of the 3D-printing system 100 via communication lines (not shown).

The controller 114 may control actuators (not shown) to control operations of the components of the 3D-printing system 100. For example, the controller 114 may further control actuators that control the movement of build material from a storage location (not shown) to a position to be spread onto the build area surface 116 and/or a previously formed layer of build material. The controller 114 may also control actuators that control the deposition and spreading of build material across the build area surface 116 and/or the previously formed layer of build material. The controller 114 may also control actuators that control the feeding of agents (e.g., fusing agents, detailing agents, coloring agents, other agents, etc.) into the printhead(s). The controller 114 may additionally control actuators that control the application of agents to the build material. The controller 114 may also control actuators that control application of energy to the agents and build material. The controller 114 may further control actuators that raise and lower the build area platform 102 along the z direction.

The controller 114 may communicate with a data store 112. The data store 112 may be machine-readable storage medium. Machine-readable storage may be any electronic, magnetic, optical, or other physical storage device that stores executable instructions. Thus, a machine-readable storage medium may be, for example, Random-Access Memory (RAM), an Electrically Erasable Programmable Read-Only Memory (EEPROM), Magnetoresistive Random-Access Memory (MRAM), a storage drive, an optical disc, and the like.

The data store 112 may include data pertaining to part 104 and/or part 106 to be printed by the 3D-printing system 100. For example, the data store 112 may store data pertaining to the geometry of part 104 and/or part 106. The data store 112 may also store data pertaining to the location and orientation of the part 104 and/or part 106 in the build volume 108. As described below, machine-readable storage medium may also be encoded with executable instructions for controlling 3D-printing system 100. For example, the data store 112 may include machine-readable instructions that cause the controller 114 to control the supply of material to the printhead, control movement of the printhead, and/or control deposition and/or spreading of build material, fusing agents, detailing agents, coloring agents, etc.

In one example, the data store 112 may further include machine-readable instructions that cause the controller 114 to access a plurality of 3D parts. The machine-readable instructions may further cause the controller to determine a collision-free packing of the 3D parts optimized for thermal uniformity based on at least one of a count of undesirable regions, a count of undesirable difference regions, and a cumulative difference score.

In an example, the machine-readable instructions may cause the controller 114 to slice the build volume 108 into a plurality of slices. The machine-readable instructions may further cause the controller 114 to determine, for each region of a slice that includes a 3D part, an area and an area-to-perimeter ratio. The machine-readable instructions may cause the controller 114 to mark a region as undesirable when the area and the area-to-perimeter ratio for the region exceed predetermined thresholds. The machine-readable instructions may further cause the controller 114 to determine a count of undesirable regions for the build volume 108. The machine-readable instructions may also cause the controller 114 to determine a collision-free packing of the 3D parts that minimizes the count of undesirable regions for the build volume 108.

In another example, the machine-readable instructions may cause the controller 114 to slice the build volume 108 into a plurality of slices. The machine-readable instructions may further cause the controller 114 to determine, for each pair of successive slices, difference regions between regions that include a 3D part. The machine-readable instructions may cause the controller 114 to determine, for each difference region, an area and an area-to-perimeter ratio. The machine-readable instructions may also cause the controller 114 to mark a difference region as undesirable when the area and the area-to-perimeter ratio for the difference region exceed predetermined thresholds. The machine-readable instructions may cause the controller 114 to determine a count of undesirable difference regions for the build volume 108. The machine-readable instructions may further cause the controller 114 to determine a collision-free packing of the 3D parts that minimizes the count of undesirable difference regions for the build volume 108.

In a further example, the machine-readable instructions may cause the controller 114 to determine, for each of the plurality of parts, a bounding box parallel to the build volume 108 and a center of mass. The machine-readable instructions may further cause the controller 114 to determine, for each of the plurality of parts, a z-height difference between a z height of the bounding box and a z height of the center of mass. The z height may refer to the height of an object in a 3D space (e.g., build volume 108, etc.) as measured by the z axis. The machine-readable instructions may cause the controller 114 to choose an orientation for a part that minimizes the z-height difference for this part. The machine-readable instructions may cause the controller 114 to lock the orientation for the part when placing the part within the build volume 108. The machine-readable instructions may cause the controller 114 to determine a cumulative difference score by summating the z-height differences for each of the plurality of parts. The machine-readable instructions may also cause the controller 114 to determine a collision-free packing of the 3D parts that minimizes the cumulative difference score.

The 3D-printing system 100 may include additional components (not shown). Further, some of the components described herein may be removed and/or modified without departing from the scope of this disclosure. The 3D-printing system 100 as depicted in FIG. 1 may not be drawn to scale and may have a different size and/or configuration than shown. For instance, the 3D-printing system 100 may include material ejecting devices to generate 3D objects with more than two different types of materials. In another example, the 3D-printing system 100 may use any of a number of different additive manufacturing techniques to build or print parts 104, 106. For example, the 3D-printing system 100 may employ any of multijet fusion, selective laser sintering, selective laser melting, stereolithography, etc. Moreover, various types of materials, e.g., power-based, liquid-based, etc., may be used by the 3D-printing system 100. For instance, thermoplastics (TCP) such as polyamide 12/nylon 12 (PA12), etc. may be used.

In addition, the apparatuses disclosed herein to determine the placement and the orientation of parts to be printed may be external to the 3D-printing system 100. For instance, the apparatuses disclosed herein may be computing devices that are to determine the placement and the orientation of the parts to be printed and to communicate the determined arrangements to the 3D-printing system 100 or additive manufacturing system.

Figure 2:
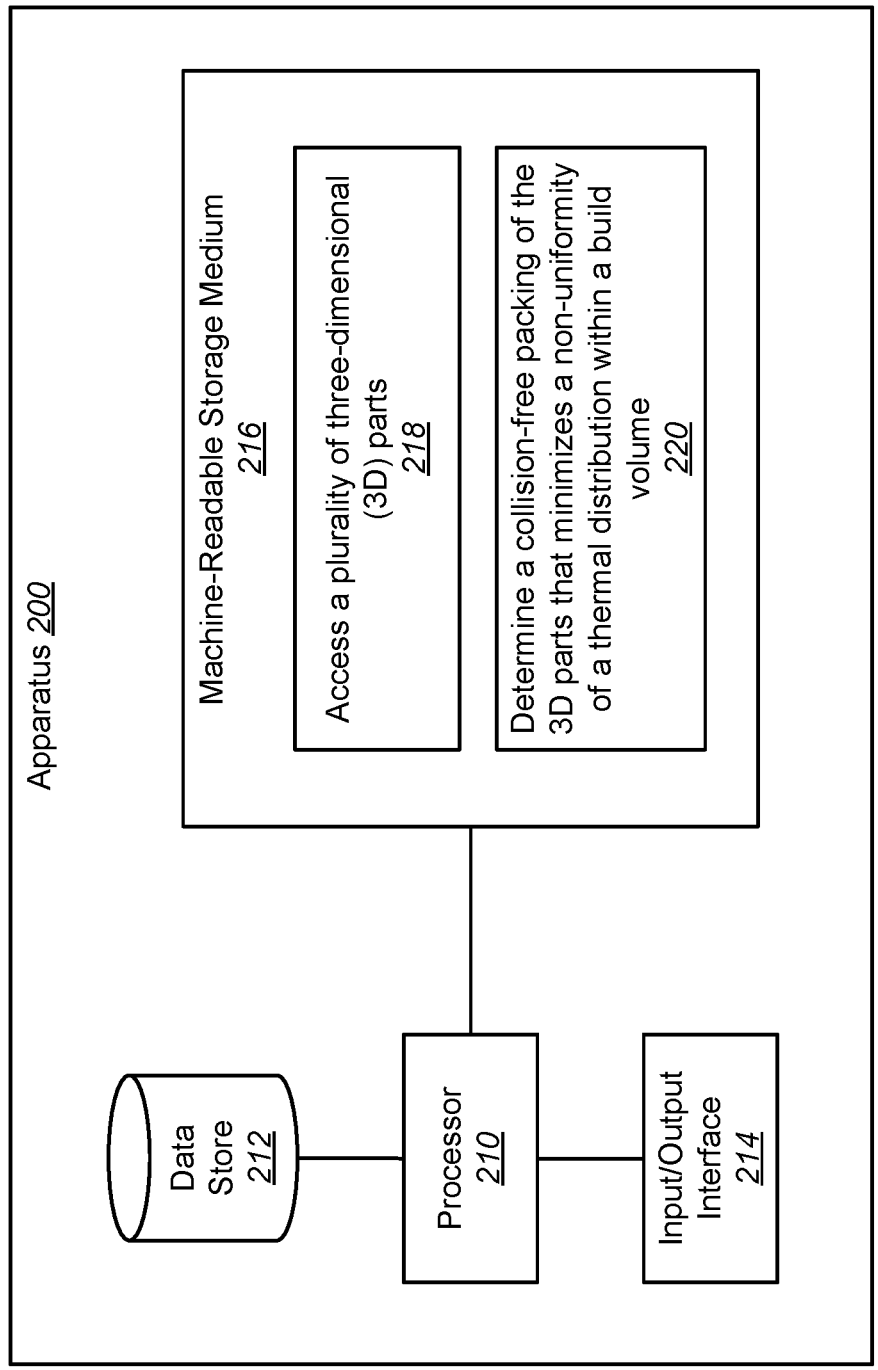
FIG. 2 is a block diagram of an example of an apparatus that may be used in an example of a method for parts packing.

FIG. 2 is a block diagram of an example of an apparatus 200 that may be used in an example of a method for parts packing. The apparatus 200 may be a computing device, such as a personal computer, a server computer, a printer, a 3D printer, a smartphone, a tablet computer, etc. In an example, the apparatus 200 may be equivalent to the controller 114 depicted in FIG. 1. The apparatus 200 may include a processor 210, a data store 212, an input/output interface 214, and a machine-readable storage medium 216. The apparatus 200 may further include additional components (not shown) and some of the components described herein may be removed and/or modified without departing from the scope of this disclosure.

The processor 210 may be any of a central processing unit (CPU), a semiconductor-based microprocessor, GPU, FPGA, an application-specific integrated circuit (ASIC), and/or other hardware devices suitable for retrieval and execution of instructions stored in the machine-readable storage medium 216. The processor 210 may fetch, decode, and execute instructions, such as instructions 218-220 stored on the machine-readable storage medium 216, to control processes to access 218 a plurality of 3D parts and to determine 220 a collision-free packing of the 3D parts in a build volume optimized for thermal uniformity based on at least one of a count of undesirable regions, a count of undesirable difference regions, and a cumulative difference score. As an alternative or in addition to retrieving and executing instructions, the processor 210 may include an electronic circuit and/or electronic circuits that include electronic components for performing the functionalities of the instructions 218-220. These processes are described in detail below with respect to FIGS. 3-7.

The machine-readable storage medium 216 may be any electronic, magnetic, optical, or other physical storage device that contains or stores executable instructions. Thus, the machine-readable storage medium 216 may be, for example, RAM, EEPROM, a storage device, an optical disc, and the like. In some implementations, the machine-readable storage medium 216 may be a non-transitory machine-readable storage medium, where the term "non-transitory" does not encompass transitory propagating signals.

The apparatus 200 may also include a data store 212 on which the processor 210 may store information, such as information pertaining to the parts to be printed. The data store 212 may be volatile and/or non-volatile memory, such as DRAM, EEPROM, MRAM, phase change RAM (PCRAM), memristor, flash memory, and the like.

The apparatus 200 may further include an input/output interface 214 through which the processor 210 may communicate with an external device(s) (not shown), for instance, to receive and store the information pertaining to the parts to be printed. The input/output interface 214 may include hardware and/or machine-readable instructions to enable the processor 210 to communicate with the external device(s). The input/output interface 214 may enable a wired or wireless connection to the output device(s). The input/output interface 214 may further include a network interface card and/or may also include hardware and/or machine-readable instructions to enable the processor 210 to communicate with various input and/or output devices, such as a keyboard, a mouse, a display, another computing device, etc., through which a user may input instructions into the apparatus 200.

Figure 3:
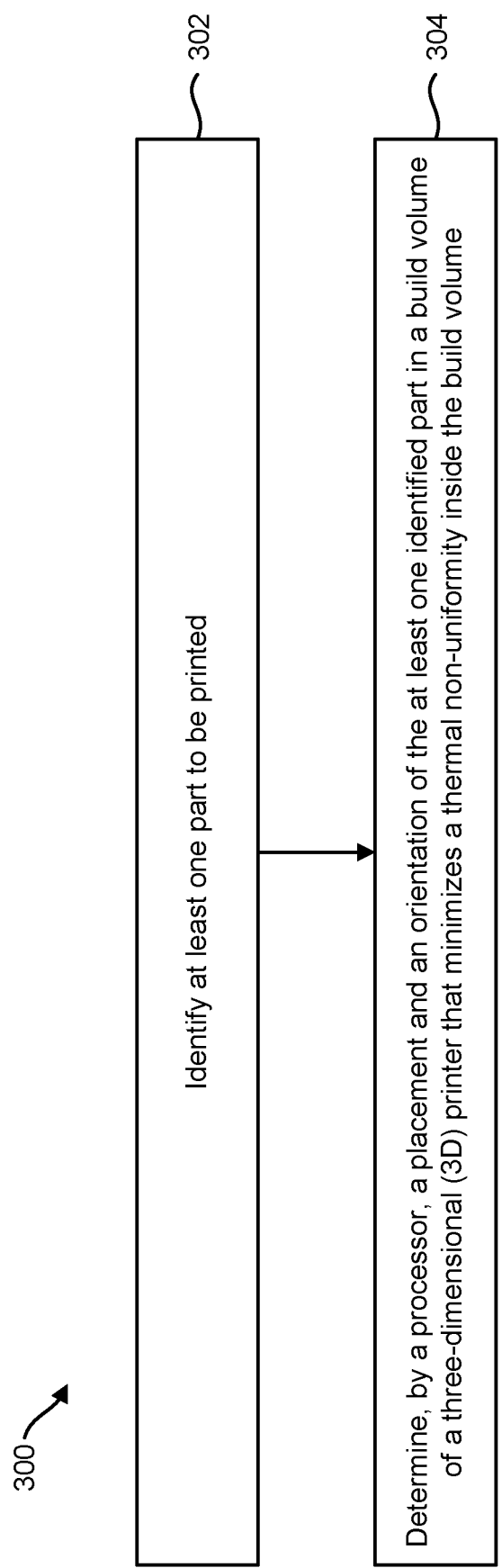
FIG. 3 is a flow diagram illustrating an example of a method for parts packing.

FIG. 3 is a flow diagram illustrating an example of a method 300 for parts packing. The method 300 for parts packing may be performed by, for example, the controller 114 and/or the apparatus 200. The apparatus may identify 302 at least one part to be printed. The apparatus may determine 304, by a processor, a placement and an orientation of the at least one identified part in a build volume 108 of a 3D printer that optimizes a thermal uniformity (e.g., minimizes a thermal non-uniformity and/or maximizes a thermal uniformity) inside the build volume 108. In one example, the thermal uniformity inside the build volume 108 may be optimized when each part voxel in the build volume 108 experiences heating, melting, and cooling processes that vary within predetermined tolerances.

In one configuration, determining the placement and the orientation of the at least one identified part in the build volume 108 may comprise determining a collision-free packing for the at least one identified part that is Pareto optimal for a plurality of objectives. In this context, Pareto optimality or Pareto efficiency may be a state in which further optimizing one objective decreases the optimization of at least one other objective.

In an example, the plurality of objectives may include minimizing occurrences of undesirable regions within layers of the build volume 108. An undesirable region may comprise a region with an area and an area-to-perimeter ratio above predetermined thresholds. Further detail regarding this objective may be found in FIG. 5 below.

In another example, the plurality of objectives may include minimizing occurrence of undesirable regions in difference areas between successive layers of the build volume 108. Further detail regarding this objective may be found in FIGS. 6A-6C below.

In yet another example, the plurality of objectives may further comprise minimizing, for the at least one identified part, a difference between a z height of a center of mass and a maximum z height of a bounding box. Further detail regarding this objective may be found in FIG. 7 below.

In some configurations, the plurality of objectives may comprise other objectives. For example, the plurality of objectives may comprise maximizing a packing density. The packing density may refer to the ratio of solid parts to empty space in the build volume 108. In another example, the plurality of objectives may comprise minimizing a z height of the build volume 108. These objectives may increase the efficiency of the collision-free packing. Increased efficiency may enable the 3D-printing system 100 to print a maximum or near-maximum number of parts during a single printing operation, to print a plurality of parts in a minimized or near minimized amount of time during a single printing operation, and/or to print all of a plurality of parts in a single or in a minimized number of printing operations.

In an example, because the design domain (e.g., the set of possible placements and orientations for the parts in the build volume 108) may be very large in comparison to the available computing power, the class of stochastic optimizations (e.g., meta-heuristic processes) may be favored for generating near-optimal solutions within realistic computing times. Some examples of meta-heuristic processes that may be applied for parts packing include: genetic processes, simulated annealing, ant colony optimization, particle swarm optimization, etc.

In one example involving the use of a genetic process, each population may be composed of many individuals (or creatures or phenotypes). Each individual may represent a complete parts packing solution. Each individual may be represented by chromosomes that encode an option for parts placement (e.g., three floating-point values for the x, y, and z coordinates of a part's center of mass; three floating-point values for rotational angles representing the part's orientation; and a Boolean value to indicate if the part is added to the build volume successfully). The population may be initialized by random-number generators.

In this example, an individual may be scored for each objective function—e.g., z-height for build volume, number of undesirable thermal regions, etc. In one configuration, preferences may be provided among all objectives. For instance, objectives may be assigned relative weights, which may enable assembly of all scores into a single fitness value. The genetic process may rely on the fitness value to determine which individuals are preserved in future generations (e.g., survivability).

In some examples, termination of a genetic process may be determined based on a total allowed computing time and/or the rate of fitness improvement. For example, when the computing time exceeds the allowed computing time and/or the fitness improvement rate stagnates according to predetermined criteria, the process may terminate and the current best solution may be outputted.

Figure 4:
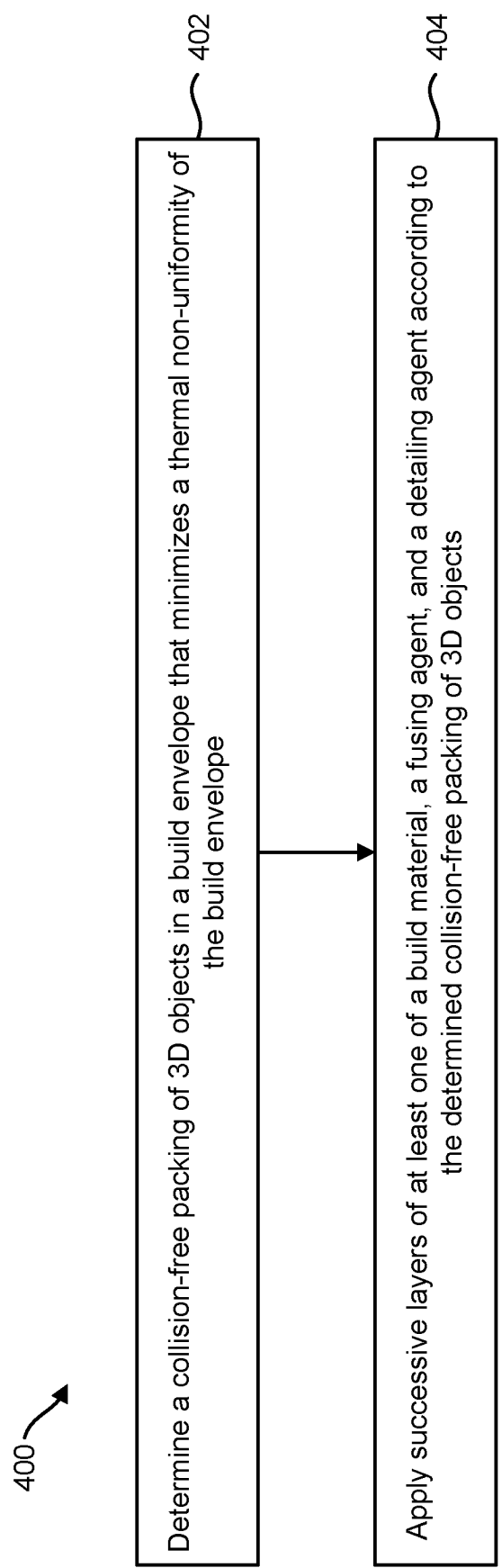
FIG. 4 is a flow diagram illustrating an example of a 3D-printing method.

FIG. 4 is a flow diagram illustrating an example of a 3D-printing method 400. The 3D-printing method 400 may be performed by, for example, the 3D-printing system 100 and/or the apparatus 200. The 3D-printing system 100 may determine 402 a collision-free packing of 3D objects in a build envelope 108 that optimizes a thermal uniformity of the build envelope 108. The 3D-printing system 100 may apply 404 successive layers of at least one of a build material, a fusing agent, and a detailing agent according to the determined collision-free packing of 3D objects. In an example, determining the collision-free packing of 3D objects in the build envelope 108 may include determining a concentration and a distribution of agents (e.g., fusing agents, detailing agents, and/or other agents that may influence thermal energy received by the build material) inside the build envelope 108. In a further example, the thermal uniformity of the build envelope 108 may be optimized (e.g., the thermal non-uniformity of the build envelope 108 may be minimized) when each part voxel in the build envelope 108 experiences heating, melting, and cooling processes that vary within predetermined thresholds.

In some examples, the method of parts packing in FIG. 3 and/or the 3D-printing method of FIG. 4 may be implemented in a system for computer-aided design and/or analysis that may be operated by, for example, an apparatus 200. In an example, a system may allow a user to select and/or enter parameters that reflect a current state of a 3D-printing system 100. 3D-printing systems 100 may have sizable system-to-system variation. The thermal behavior of a 3D-printing system 100 may also drift over time. A system for computer-aided design and/or analysis may enable a user to select and/or enter parameters for optimizing a collision-free packing of parts. These parameters may include values used in metrics that may be used to optimize the parts packing to minimize a thermal non-uniformity inside the build volume and priorities for the metrics. The system may provide an analysis of the packing in view of the selected/entered parameters and provide recommendations for further optimizations. The system may further allow users to override the recommendations.

For a set of parts to be printed, there may exist multiple collision-free packing solutions within a build volume 108 of a 3D-printing system 100. In connection with FIGS. 5-7 below, this disclosure describes some examples of metrics that may be used to evaluate the thermal uniformity of a packing. These metrics may in turn be used to determine a collision-free packing that optimizes the thermal uniformity inside the build volume 108.

For a collision-free packing, a build volume 108 may be sliced into a plurality of build layers or slices. Each slice may be a two-dimensional representation along the x and z axes of the build volume 108 for a given z height. In some examples, each slice may correspond to an additive layer in a 3D-printing process.

Figure 5:
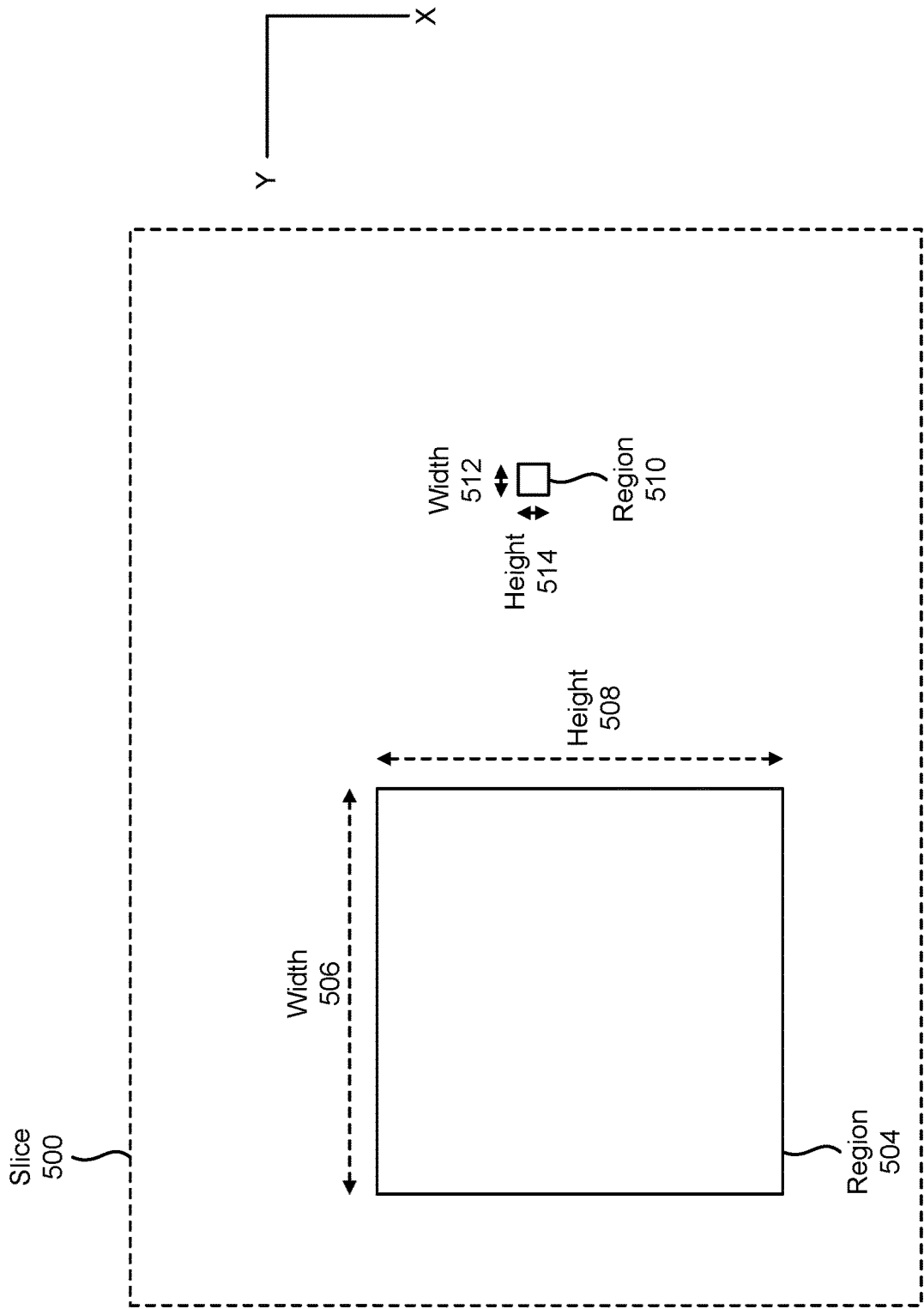
FIG. 5 is a diagram of an example of a slice of a 3D build volume.
Figure 6:
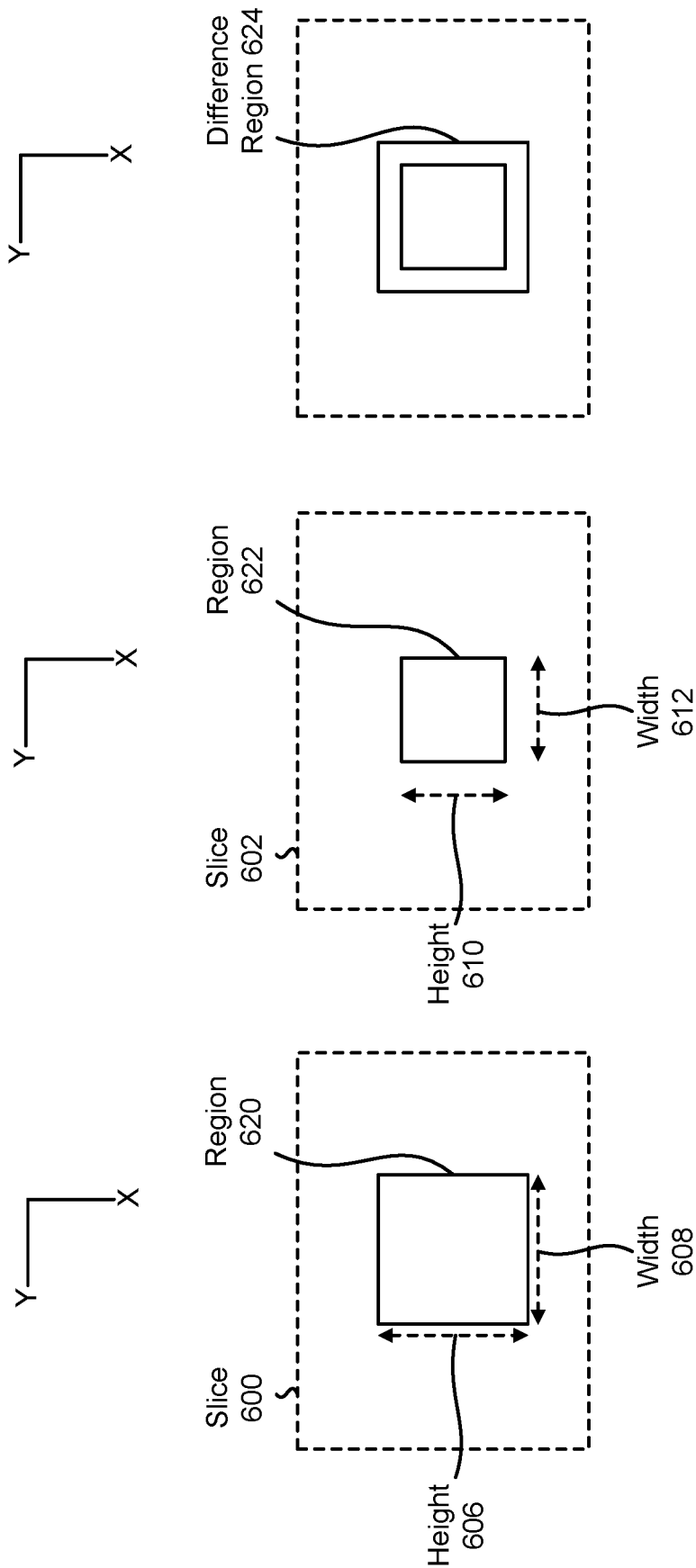
FIG. 6A is a diagram of an example of a first consecutive slice of a 3D build volume.
FIG. 6B is a diagram of an example of a second consecutive slice of a 3D build volume.
FIG. 6C is a diagram of an example of differences between the slice of FIG. 6A and the slice of FIG. 6B.

FIG. 5 is a diagram of an example of a slice 500 of a 3D build volume 108. Slice 500 includes region 504 and region 510, which may represent areas in the slice 500 that correspond to parts 104 and/or 106 positioned in the build volume 108. In some examples, regions 504 and/or 510 may be referred to as islands. In the example of FIG. 5, region 504 may be rectangular in shape with a width 506 and height 508, and region 510 may be rectangular in shape with a width 512 and height 514. In other examples, more or less regions may be shown, and each region may have different and irregular shapes depending on the placement, orientation, shape, and number of parts in the build volume 108.

In some configurations, the area of region 504 may be determined, for example, by multiplying the width 506 by the height 508. The area of region 510 may be determined, for example, by multiplying the width 512 by the height 514. The perimeter of region 504 may be determined, for example, by summing the width 506 and height 508 and multiplying by 2. The perimeter of region 510 may be determined, for example, by summing the width 512 and the height 514 and multiplying by 2. The area-to-perimeter ratios for region 504 and region 510 may be determined by dividing each region's respective area by the region's respective perimeter.

In another configuration, the area and the perimeter of region 504 and region 510 may be determined by pixel counting. For example, each pixel in the x-y plane may have a known area and known edge lengths. The area of a region 504 and/or region 510 may thus be determined by counting the number of pixels in the region 504 and/or region 510 and multiplying by the known area for a single pixel. The perimeter of a region 504 and/or 510 may be determined by summing the edge lengths of pixel edges that make up the perimeters of region 504 and/or region 510.

In still another configuration, each region 504 and/or region 510 may be considered a polygon. The perimeter of a region 504 and/or a region 510 may be computed by summing all lengths of the polygon edges. The area may be determined by dividing the polygon into a group of triangles. The area of a single triangle may be computed based on the lengths of the triangle edges. The area may then be computed for the polygon by summing up the areas of the triangles.

Other methods of calculating the area, perimeter, and area-to-perimeter ratio may be used without departing from the scope of this disclosure.

In some examples, a region may be considered an undesirable region when an area and an area-to-perimeter ratio for the region are greater than predetermined thresholds. The predetermined thresholds may be determined experimentally and/or using simulation. Regions with larger areas and higher area-to-perimeter ratios may cause significant thermal buildup, which may contribute to increased thermal non-uniformity.

In one example, a count of undesirable regions for a build volume 108 may be determined. For instance, a counter may be initialized to 0 and incremented by 1 for each region of a slice with an area and an area-to-perimeter ratio above the predetermined thresholds. The counters for all slices in the build volume 108 may then be summed to determine a count of undesirable regions for the build volume 108. A maximum per-slice count of undesirable regions may also be determined as the counter with the highest value. Other methods for counting the undesirable regions in the build volume 108 may be used without departing from the scope of this disclosure.

In some configurations, the count of undesirable regions in the build volume 108 may be used to determine a collision-free packing of 3D parts that produces a uniform thermal distribution (i.e., minimizes a thermal non-uniformity and/or maximizes a thermal uniformity) within the build volume 108. For example, a parts packing with lower counts of undesirable regions in the build volume may be selected. When packing solutions have the same count of undesirable regions in the build volume, the packing solution with the lower maximum per-slice count of undesirable regions may be selected. In other examples, different priorities may be assigned to the count of undesirable regions and the maximum per-slice count of undesirable regions. In still other examples, other variations of the count of undesirable regions may be used, such as the minimum per-slice count of undesirable regions, the median per-slice count of undesirable regions, the mode per-slice count of undesirable regions, etc.

Optimizing the packing of 3D parts based on the count of undesirable regions in the build volume 108 may affect part distribution and/or part orientation in the build volume 108. For instance, the minimization of the maximum per-layer count of undesirable regions may evenly distribute parts with larger shapes and volumes across the z axes of the build volume. In another example, optimizing based on the count of undesirable regions may cause flat objects to be oriented with a tilted angle (e.g., tilted or angled in the z direction).

FIG. 6A and FIG. 6B are diagrams of examples of a first consecutive slice 600 and a second consecutive slice 602, respectively, of a 3D build volume 108. Slice 600 includes region 620, which may represent an area in the slice 600 that corresponds to a part 104 and/or part 106 positioned in a build volume 108. Slice 602 includes region 622, which may represent an area in the slice 602 that corresponds to a part 104 and/or part 106 in the build volume 108. Slices 600 and 602 may be consecutive among the plurality of slices that comprise the build volume 108. In the examples of FIG. 6A and FIG. 6B, region 620 and region 622 may be rectangular in shape. Region 620 may have a height 606 and a width 608, and region 622 may have a height 610 and a width 612. In other examples, more or less regions may be shown, and each region may have different and irregular shapes depending on the placement, orientation, shape, and number of parts in the build volume 108.

FIG. 6C is a diagram of an example of differences between the slice 600 of FIG. 6A and the slice 602 of FIG. 6B. Difference region 624 may represent the non-overlapping portions of region 620 and region 622. In other words, difference region 624 may represent areas where either slice 600 or 602 includes a region, but not areas where both slice 600 and 602 include a region and not areas where both slice 600 and 602 do not contain a region. Difference region 624 may be determined, for example, by computing a pixel-by-pixel exclusive or (XOR) operation of slice 600 and slice 602. In other examples, different methods for determining difference regions may be utilized.

In some configurations, the area of difference region 624 may be determined, for example, by subtracting the area of region 622 from the area of region 620. The outer perimeter of difference region 624 may be the perimeter of region 620. The inner perimeter of difference region 624 may be the perimeter of region 622. In some examples, the outer perimeter may be used to determine the area-to-perimeter ratio for the difference region. Other methods of calculating the area, outer perimeter, inner perimeter, and area-to-perimeter ratio may be used without departing from the scope of this disclosure. A difference region may be considered an undesirable difference region when an area and an area-to-perimeter ratio for the difference region are greater than predetermined thresholds. The predetermined thresholds may be generated via experimentation and/or simulation.

In one example, a count of undesirable difference regions for a build volume 108 may be determined. For instance, a counter may be initialized to 0 and incremented by 1 for each difference region in consecutive slices with an area and an area-to-perimeter ratio above the predetermined thresholds. The counters for all consecutive slices in the build volume 108 may then be summed to determine a count of undesirable difference regions for the build volume 108. A maximum count of undesirable difference regions per consecutive slices may also be determined as the counter with the highest value. Other methods for counting the undesirable difference regions in the build volume 108 may be used without departing from the scope of this disclosure.

In some configurations, the count of undesirable difference regions in the build volume 108 may be used to determine a collision-free packing of 3D parts that produces a uniform thermal distribution (i.e., minimizes a thermal non-uniformity and/or maximizes a thermal uniformity) within the build volume 108. For example, packing solutions with lower counts of undesirable difference regions in the build volume may be selected. When packing solutions have the same count of undesirable difference regions in the build volume, the packing solution with the lower maximum count of undesirable difference regions per consecutive slices may be selected. In other examples, different priorities may be assigned to the count of undesirable difference regions and the maximum count of undesirable regions per consecutive slices. In still other examples, other variations of the count of undesirable difference regions may be used, such as the minimum count of undesirable difference regions per consecutive slices, the median count of undesirable difference regions per consecutive slices, the mode count of undesirable difference regions per consecutive slices, etc.

Figure 7:
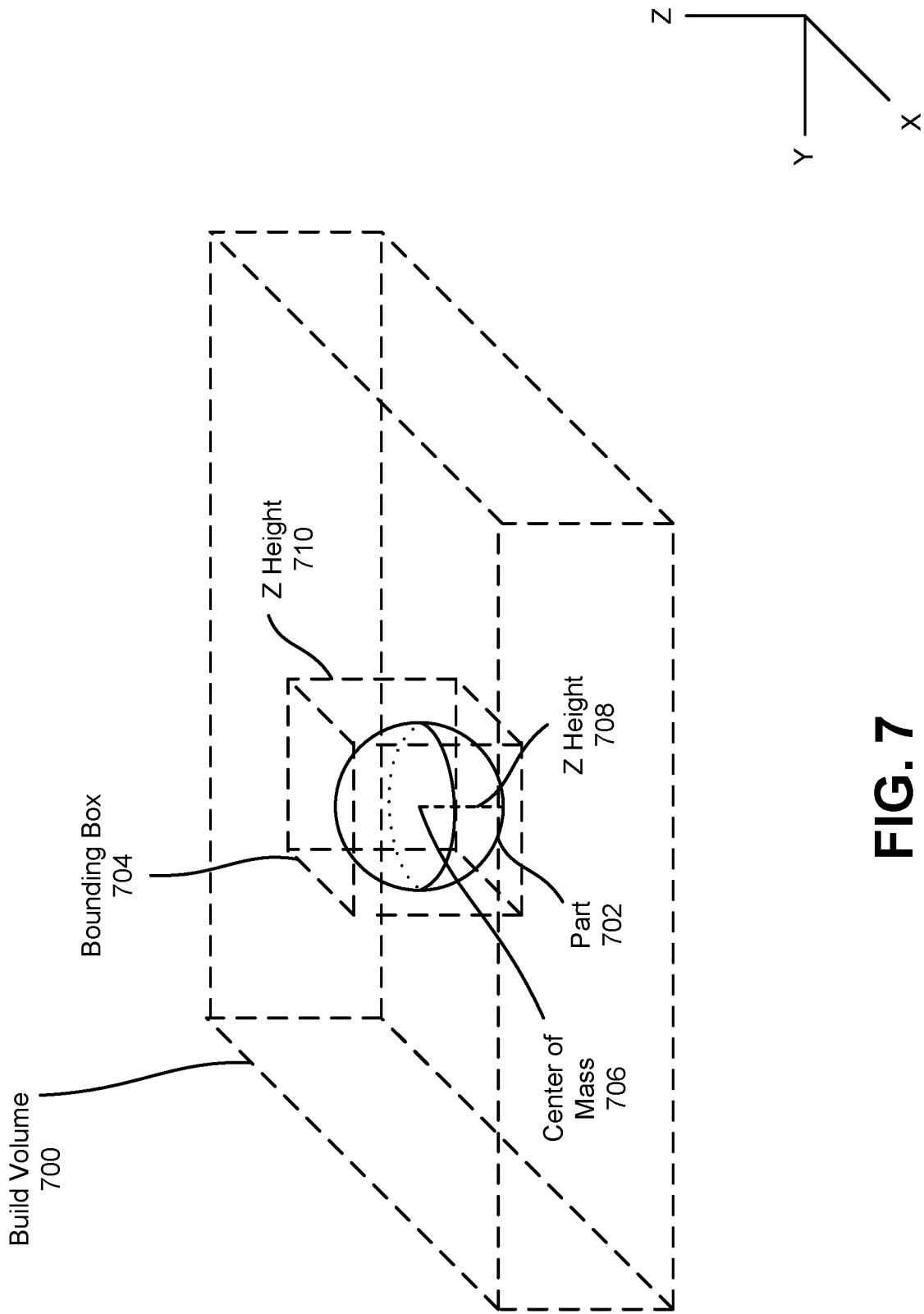
FIG. 7 is a diagram of an example of a part and a bounding box in a build volume.

FIG. 7 is a diagram of an example of a part 702 and a bounding box 704 in a build volume 700. In the example of FIG. 7, one spherical part 702 is illustrated. In other examples, a plurality of parts of the same or different shapes and sizes may be placed and oriented within build volume 700 as part of a collision-free packing.

Part 702 may have a center of mass 706. In one example, part 702 may be represented as a system of particles $P_i$, i=1, n, each particle having a mass $m_i$ with coordinates $(x_i, y_i, z_i)$, i=1, n. The coordinates of the center of mass 706 may be determined by the equations $$x_{cm} = \frac{1}{M}\sum_{i=1}^{n} m_i x_i,$$

$$y_{cm} = \frac{1}{M}\sum_{i=1}^{n} m_i y_i, \text{ and}$$

$$z_{cm} = \frac{1}{M}\sum_{i=1}^{n} m_i z_i,$$

where M is the sum of the masses of all of the particles—i.e., $M = \sum_{i=1}^{n} m_i$. In one configuration, each voxel may be treated as a particle and the mass of each voxel may be determined based on the expected volume and density of build material, agents, and/or other materials included in the printed voxel.

In another example, the center of mass 706 may be determined geometrically. For instance, a part 702 may be defined by a set of tetrahedrons. For each tetrahedron, the center of mass, the volume, and the resulting moment may be calculated. The center of mass 706 for the part 702 may then be determined based on the centers of mass for all the tetrahedrons.

In still other examples, other methods for calculating the center of mass 706 may be used.

Part 702 may be bounded by bounding box 704. In an example, bounding box 704 may be parallel with the build volume—i.e., each edge of the bounding box 704 is parallel with at least one of the edges of the build volume 700. In an example, a bounding box 704 for a part 702 may be determined based on the maximum and minimum x, y, and z coordinates of the part. In other examples, other methods for calculating the bounding box 704 may be used.

In one example, a cumulative difference score for a build volume 700 may be determined. For instance, a difference between the z height 710 of the bounding box 704 and the z height 708 of the center of mass 706 may be determined for each part in the build volume 700. The cumulative difference score may then be computed by summating the z-height differences for each of the parts. A maximum z-height difference may also be determined as the z-height difference with the highest value. A minimum z-height difference may further be determined as the z-height difference with the lowest value. Other methods for determining the cumulative difference score may be used without departing from the scope of this disclosure.

In some configurations, the cumulative difference score may be used to determine a collision-free packing of 3D parts that optimizes a thermal uniformity within the build volume 700. For example, packing solutions with lower cumulative difference scores may be selected. When packing solutions have the same cumulative difference score, the packing solution with the lower maximum z-height difference may be selected. In other examples, different priorities may be assigned to the cumulative difference score and the maximum z-height difference. In still other examples, other variations of the cumulative difference score may be used, such as the minimum z-height difference, the median z-height difference, the mode z-height difference, etc.

Optimizing the packing of 3D parts based on the cumulative difference score in the build volume 108 may affect part distribution and/or part orientation in the build volume 108. For instance, the minimization of the cumulative difference score may push parts with more material (e.g., build material, agents, etc.) towards the top of the build volume. In another example, optimizing based on the cumulative difference score may orient parts such that denser portions of the part (e.g., in terms of build material, agents, etc.) are above less dense portions of the part. Orienting parts in this manner may minimize thermal bleed in the z direction and/or delay thermal buildup in the z direction.

The invention claimed is:

1. A method for parts packing, comprising: identifying at least one part to be printed; determining, by a processor, a placement and an orientation of the at least one identified part in a build volume of a three-dimensional (3D) printer such that variances between thermal experiences of each voxel in the build volume are within predetermined tolerances; wherein the thermal experiences comprise heating, melting and cooling, and printing the at least one part to be printed based on the determined placement and orientation of the identified part on the 3D printer.

2. The method of claim 1, wherein determining the placement and the orientation of the at least one identified part in the build volume comprises determining a collision-free packing for the at least one identified part that is Pareto optimal for a plurality of objectives.

3. The method of claim 2, wherein the plurality of objectives comprises minimizing occurrence of undesirable regions within layers of the build volume, wherein an undesirable region comprises a region with an area and an area-to-perimeter ratio above predetermined thresholds.

4. The method of claim 3, wherein the plurality of objectives further comprises minimizing occurrences of undesirable regions in difference areas between successive layers of the build volume.

5. The method of claim 4, wherein the plurality of objectives further comprises minimizing, for the at least one identified part, a difference between a z-height of a center of mass and a maximum z-height of a bounding box.

6. The method of claim 5, wherein the plurality of objectives further comprises at least one of maximizing a packing density and minimizing a z-height of the build volume.

7. The method of claim 2, wherein the collision-free packing for the at least one identified part that is Pareto optimal for the plurality of objectives is determined using a meta-heuristic process.

8. A three-dimensional (3D)-printing method, comprising: determining a collision-free packing of 3D objects in a build envelope such that variances between thermal experiences of each voxel in the build envelope are within predetermined thresholds; wherein the thermal experiences comprise heating, melting and cooling, and applying successive layers of at least one of a build material, a fusing agent, and a detailing agent according to the determined collision-free packing of 3D objects.

9. The 3D-printing method of claim 8, wherein determining the collision-free packing of 3D objects in the build envelope comprises determining a concentration and a distribution of agents inside the build envelope.

10. A non-transitory machine-readable storage medium comprising machine-readable instructions that when executed by a processor, cause the processor to: access a plurality of three-dimensional (3D) parts; determine a collision-free packing of the 3D parts in a build volume based on at least one of a count of undesirable regions, a count of undesirable difference regions, and a cumulative difference score, wherein the collision-free packing of the 3D parts are determined such that variances between thermal experiences of each voxel in the build volume are within predetermined tolerances; wherein the thermal experiences comprise heating, melting and cooling, and causing a 3D printer to print the 3D parts based on the determined collision-free packing of the 3D parts.

11. The non-transitory machine-readable storage medium of claim 10, further comprising machine-readable instructions that when executed by the processor, cause the processor to:
slice the build volume into a plurality of slices;
determine, for each region of a slice that includes a 3D part, an area and an area-to-perimeter ratio;
mark a region as undesirable when the area and the area-to-perimeter ratio for the region exceed predetermined thresholds;
determine a count of undesirable regions for the build volume; and
determine a collision-free packing of the 3D parts that minimizes the count of undesirable regions for the build volume.

12. The non-transitory machine-readable storage medium of claim 10, further comprising machine-readable instructions that when executed by the processor, cause the processor to:
slice the build volume into a plurality of slices;
determine, for each pair of successive slices, difference regions between regions that include a 3D part;
determine, for each difference region, an area and an area-to-perimeter ratio;
mark a difference region as undesirable when the area and the area-to-perimeter ratio for the difference region exceed predetermined thresholds;

determine a count of undesirable difference regions for the build volume; and determine a collision-free packing of the 3D parts that minimizes the count of undesirable difference regions for the build volume.

13. The non-transitory machine-readable storage medium of claim 10, further comprising machine-readable instructions that when executed by the processor, cause the processor to:

determine, for each of the plurality of parts, a bounding box parallel to the build volume and a center of mass;

determine, for each of the plurality of parts, a z-height difference between a z height of the bounding box and a z height of the center of mass;

determine a cumulative difference score by summating the z-height differences for each of the plurality of parts; and determine a collision-free packing of the 3D parts that minimizes the cumulative difference score.

\* \* \* \* \*